US009842001B2

United States Patent
Drahzal et al.

(10) Patent No.: US 9,842,001 B2
(45) Date of Patent: Dec. 12, 2017

(54) SYSTEM LEVEL ACCELERATION SERVER

(75) Inventors: Matthew R. Drahzal, Bedford, NH (US); Kirk E. Jordan, Cambridge, MA (US); James C. Sexton, Yorktown Heights, NY (US); Richard O. Simpson, Athens, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 611 days.

(21) Appl. No.: 13/534,880

(22) Filed: Jun. 27, 2012

(65) Prior Publication Data
US 2014/0006477 A1  Jan. 2, 2014

(51) Int. Cl.
*G06F 9/50* (2006.01)
*G06F 9/455* (2006.01)

(52) U.S. Cl.
CPC .......... *G06F 9/5044* (2013.01); *G06F 9/5005* (2013.01); *G06F 9/5072* (2013.01); *G06F 9/45533* (2013.01); *G06F 9/5061* (2013.01); *G06F 9/5077* (2013.01); *G06F 2209/509* (2013.01)

(58) Field of Classification Search
CPC .. G06F 9/45533; G06F 9/5005; G06F 9/5055; G06F 9/5061; G06F 9/5072; G06F 9/5077
USPC ...................... 709/203, 217, 226; 718/1, 104
See application file for complete search history.

(56) References Cited

U.S. PATENT DOCUMENTS

| | | |
|---|---|---|
| 5,642,515 A * | 6/1997 | Jones .................... G06F 21/335 709/227 |
| 6,434,687 B1 | 8/2002 | Huppenthal |
| 6,647,408 B1 | 11/2003 | Ricart et al. |
| 6,772,218 B1 | 8/2004 | Noel, Jr. et al. |
| 7,302,462 B2 | 11/2007 | Kulp et al. |
| 7,885,969 B2 | 2/2011 | Natarajan et al. |
| 2002/0078174 A1* | 6/2002 | Sim .................... G06F 17/30194 709/219 |
| 2004/0249885 A1* | 12/2004 | Petropoulakis ........... G06F 9/54 709/204 |
| 2007/0094002 A1* | 4/2007 | Berstis .................. G06F 9/5072 703/22 |
| 2007/0198656 A1* | 8/2007 | Mazzaferri ........... G06F 3/1415 709/218 |
| 2007/0255782 A1* | 11/2007 | Tannenbaum ........ G06F 9/4843 709/201 |
| 2008/0126472 A1 | 5/2008 | Botchek |
| 2008/0320151 A1 | 12/2008 | McCanne et al. |
| 2009/0132582 A1 | 5/2009 | Kim et al. |
| 2009/0132638 A1 | 5/2009 | Kim et al. |
| 2010/0058031 A1 | 3/2010 | Aho et al. |

(Continued)

*Primary Examiner* — Jeong S Park
(74) *Attorney, Agent, or Firm* — F. Chau & Associates, LLC.

(57) ABSTRACT

A method for system level acceleration includes managing, by a system level acceleration server, an accelerator program running on an accelerator machine on behalf of a client, receiving, by the system level acceleration server, a communication from the client, interacting, by the system level acceleration server, with the accelerator program on behalf of the client according to the communication from the client, and generating, by the accelerator machine, a deliverable for provision to the client based upon an output of the accelerator program.

16 Claims, 9 Drawing Sheets

(56) References Cited

U.S. PATENT DOCUMENTS

2012/0072762 A1* 3/2012 Atchison ............... G06F 9/5072
714/2
2012/0220857 A1* 8/2012 Warr .................. G01R 33/4806
600/411

* cited by examiner

SYSTEM LEVEL ACCELERATION SERVER

BACKGROUND OF THE INVENTION

1. Technical Field

The present disclosure generally relates to an accelerator machine and more particularly to a system level accelerator server.

2. Discussion of Related Art

High-performance, highly parallel computers typically require special expertise in programming for effective application. To achieve performance close to a computer's capabilities, the programmer must be expert in the science of the problem being solved and in the field of parallel programming. Further, these computers typically operate much like a batch job mainframe. Therefore, the high-performance computing power of these computers is not generally available to ordinary users.

BRIEF SUMMARY

According to an embodiment of the present disclosure, a method for system level acceleration includes managing, by a system level acceleration server, an accelerator program running on an accelerator machine on behalf of a client, receiving, by the system level acceleration server, a communication from the client, interacting, by the system level acceleration server, with the accelerator program on behalf of the client according to the communication from the client, and generating, by the accelerator machine, a deliverable for provision to the client based upon an output of the accelerator program According to an embodiment of the present disclosure, a method for system level acceleration includes managing an accelerator program running on an accelerator machine on behalf of a client, receiving a communication from the client, and interacting with the accelerator program on behalf of the client according to the communication from the client.

According to an embodiment of the present disclosure, a system level acceleration system including a system level acceleration server, an accelerator communicating with the system level acceleration server and executing a program of instructions on behalf of a client, and a client communicating with the system level acceleration server, wherein the system level acceleration server passes a control from the client to the accelerator and a result from the accelerator to the client.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

According to an embodiment of the present disclosure, an accelerator may be implemented with a software application to interact with and control operations of a machine running the software application. Exemplary embodiments of the present disclosure are described in the context of a BLUE GENE accelerator machine, wherein general access to the machine may be provided such that an accelerator is in connection with an application running on a client machine (e.g., laptop, desktop computer, smart-phone, tablet device, etc.) to interact with and control computations running on the machine.

Figure 1:
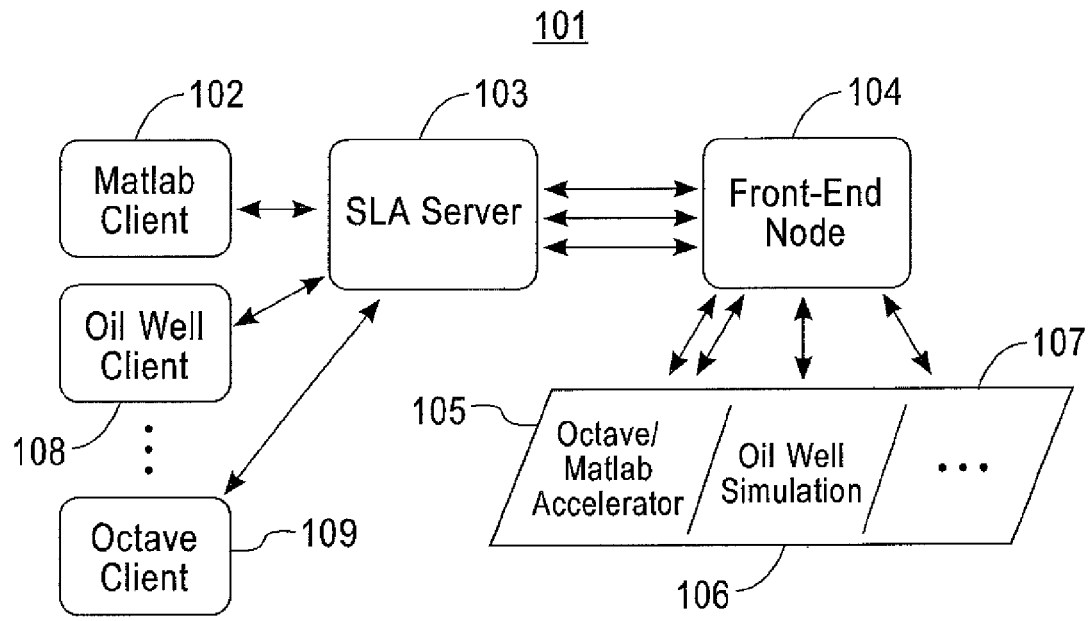
FIG. 1 is a diagram of a computer network configured with a special purpose accelerator according to an embodiment of the present disclosure.

Referring to FIG. 1, an accelerator machine 101 is a high-performance computer, such as BLUE GENE, running programs that perform computations on behalf of a client. A client 102 may include a device executing software such as MATLAB® or Octave, a device executing software written specifically to interact with an accelerator, a web browser based client, smart-phone, tablet device, etc. A system level accelerator server 103 is disposed as intermediary between a client 102 and an accelerator machine 101. The system level accelerator server 103 knows which accelerators are available and what their capabilities are. The system level accelerator server 103 acts as central point to which both clients and accelerators connect. Through the system level accelerator server 103, the client 102 can request access to a particular accelerator 101, or can request any accelerator with the appropriate capability.

The system level accelerator server 103 may simultaneously support multiple clients of disparate types. The system level accelerator server 103 may simultaneously support multiple accelerators of disparate types.

The system level accelerator server 103 passes command, control, and response messages between the client 102 and the accelerator machine 101.

The system level accelerator server 103 monitors long-running accelerator computations. For example, the system level accelerator server 103 can receive progress messages from the accelerator 101. Progress messages may be used to update a progress bar displayed through its web server interface, and can alert a client to the progress of the accelerator computations. Lack of receipt of such progress messages can result in the system level accelerator server 103 sending a warning message to the accelerator's client 102.

The system level accelerator server 103 provides an interface, e.g., an HTML interface, on the client side so that server's activities can be observed and controlled via a web browser.

In a general case, the system level accelerator server 103 runs on a server machine different than any of the accelerators or clients.

Referring more particularly to FIG. 1, a system level accelerator server 103 installation provides access to a set of computations running on the accelerator machine 101. The system level accelerator server 103 is executing on a dedicated server machine. It should be understood that the system level accelerator server 103 may be implemented as software executing on a front-end node 104 of an accelerator or on a client device. In FIG. 1, a front-end node 104 of an accelerator machine 101 provides access to multiple accelerators 105-107.

In the exemplary computer network of FIG. 1, a program of instructions 105 executing on the accelerator machine 101 functions as an accelerator for a MATLAB client 102, performing parallel computations on matrices that may be too large or computations that may be too long-running to be handled by MATLAB applications running on client 102.

In another example, a special simulation program 106, such as a simulation of an oil well, may be controlled by a client 108 written specifically for that purpose. In one example, the client 108 may use a system level accelerator server protocol to locate the special simulator, or to cause its execution to start, and would then send and receive control and response messages that are privately defined for the client and the special server. The system level accelerator server would not necessarily know the semantics of these messages; system level accelerator server may only know the semantics of the messages used to start up and shut down the simulation.

Client-server and server-accelerator communications may use an XML-based protocol. A command may be sent from a client 102 to the system level accelerator server 103, which forwards the command to the accelerator machine 101. A response is sent back from the accelerator machine 101 to the system level accelerator server 103, which sends the response on to the client 102. This allows the system level accelerator server 103 to track what computations are in progress on the accelerator machine 101, and eliminates the need for the client to know where the accelerator machine 101 is and how to contact the accelerator machine 101. The client and accelerator need only know how to contact the system level accelerator server 103.

It should be appreciated that embodiments of the client-server and server-accelerator communications are not limited to the XML-based protocol and that various methods may be used, including hierarchical data definition languages, JSON (Java Script Object Notation), structured binary control blocks, etc.

In FIG. 1, three clients are shown, two clients 102 and 109 for an Octave/MATLAB accelerator and one client 108 for the oil well simulation. More particularly, FIG. 1 shows three clients (102, 108, 109), with the Octave client 109 and MATLAB client 102 using the same accelerator 105 and an Octave client 109 using a different accelerator 106. In a general case, there could be more types of accelerators running on the accelerator machine 101 and more than one accelerator machine. Depending on the way the accelerators are written, there can be one or more clients for each accelerator. A general-purpose matrix calculation accelerator may be written to perform computations for more than one client simultaneously, while a specialized accelerator may be able to handle only one client at a time. The system level accelerator may be aware of these capabilities and limitations, either in the definitions of the accelerators that it is given when it starts, or by XML records sent it from the accelerators when they start.

Referring now to general-purpose clients and accelerators, the Octave/MATLAB accelerator shown in FIG. 1 is a general-purpose accelerator, in that the accelerator isn't written for a particular process or problem. The clients for general-purpose accelerators are themselves general purpose. For example, Octave and MATLAB clients are general-purpose matrix computation programs. A package of additional commands may be added to a general-purpose client, configuring the client to send portions of a computation via the system level accelerator server 103 to the accelerator and to retrieve the results of the computation.

Referring now to special-purpose clients and accelerators, the oil well simulation shown in FIG. 1 is an example of a special-purpose accelerator. The client 108 and accelerator 106 may be written to solve a particular problem or set of related problems in a particular field. In the example of an oil well simulation, the accelerator 106 may be a package of existing solvers for an oil reservoir operation that has been ported to the accelerator machine 101. The client 108 serves only to specify the parameters that control the accelerator's computations and to view the results.

The front-end node 104 is a pass-through for messages in both directions. Logically, the system level accelerator server 103 communicates directly with the accelerators. In the exemplary case of a BLUE GENE type accelerator machine 101, the accelerator machine 101 may not provide a way for the accelerators to connect directly to programs running on the "outside," namely the system level accelerator server 103. A pass through program on the front-end node 104 may be used to provide this connection.

Figure 2:
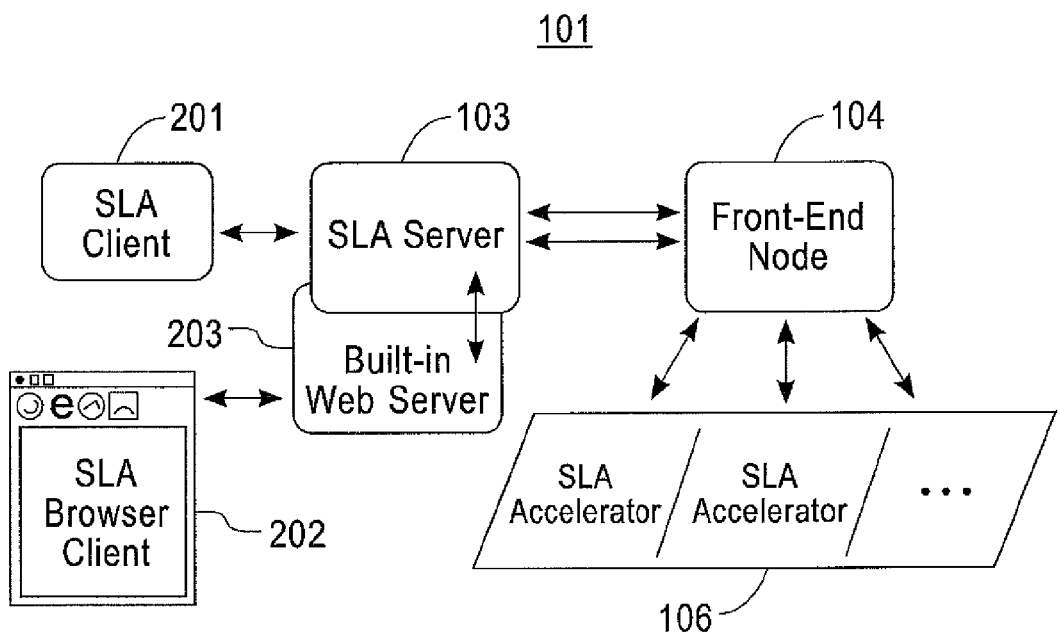
FIG. 2 is a diagram of a computer network configured with a special purpose accelerator and special purpose client according to an embodiment of the present disclosure.
Figure 3:
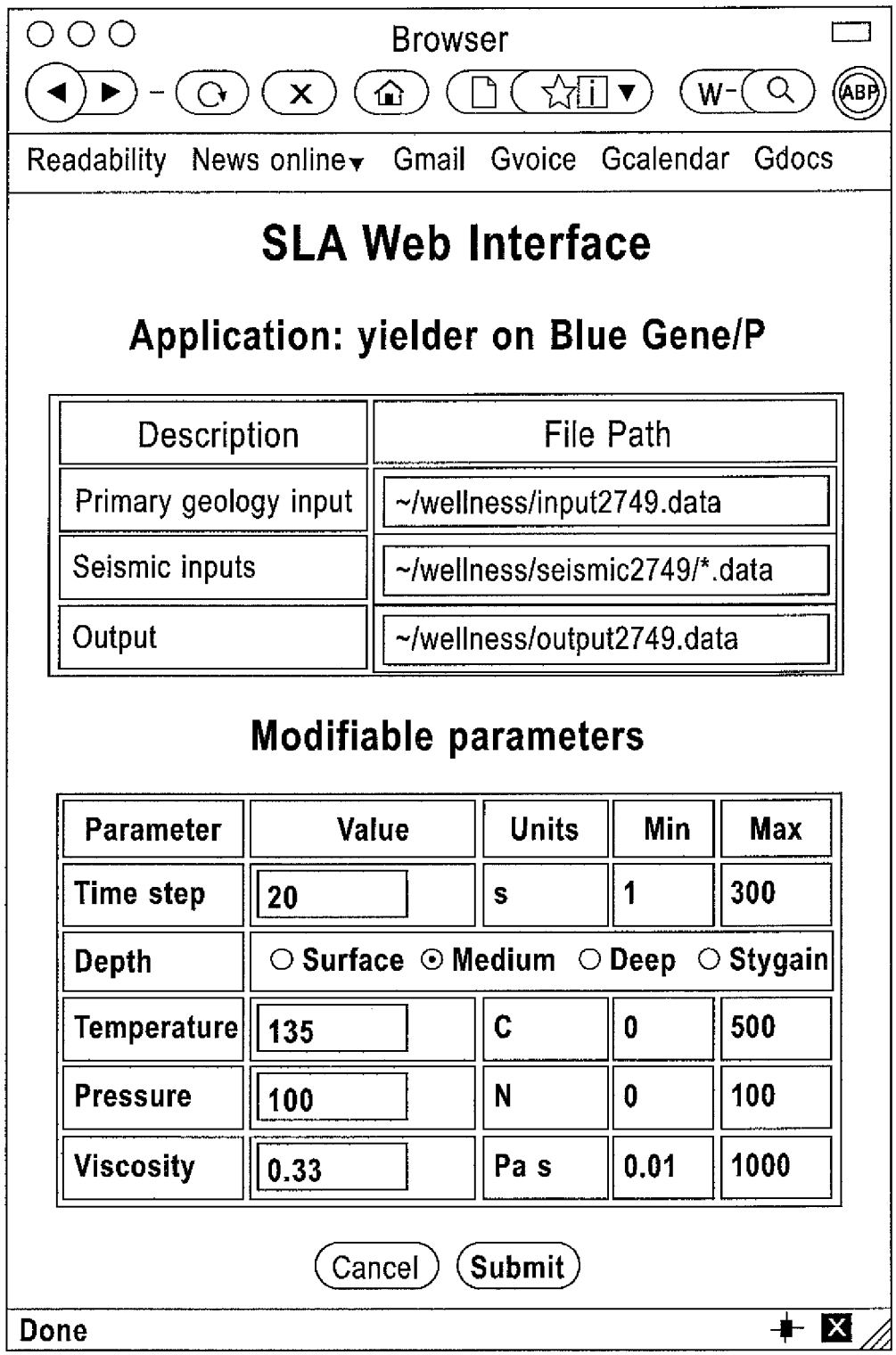
FIG. 3 is an exemplary interface including server responses according to an embodiment of the present disclosure.

Referring to FIG. 2, a special-purpose client 201 may be implemented via a web browser 202, with an end user interacting with HTML pages generated by the system level accelerator server 103 and sent via a web server 203. The end user interacts with a web page displayed by a browser 202, filling in values to be sent to the accelerator. The browser 202 communicates with the system level accelerator server's web server 203. The system level accelerator server 103 embeds the entered values into an XML record and sends that on to the accelerator machine 101. The system level accelerator server 103 formats responses from the accelerator 106 on the accelerator machine 101 into a web page for the browser 202 to display. FIG. 3 is an exemplary web page with fields for specifying and displaying information.

Special-purpose clients may be browser based, may be written as applications that run on computers or hand-held devices, etc. The special-purpose clients may be written in any programming language. The client needs to connect to and use the system level accelerator server by socket communication and to generate and parse records, e.g., XML records. In the exemplary case of clients written in C and C++, a library and a code generation tool may be provided with the system level accelerator server.

Figure 4:
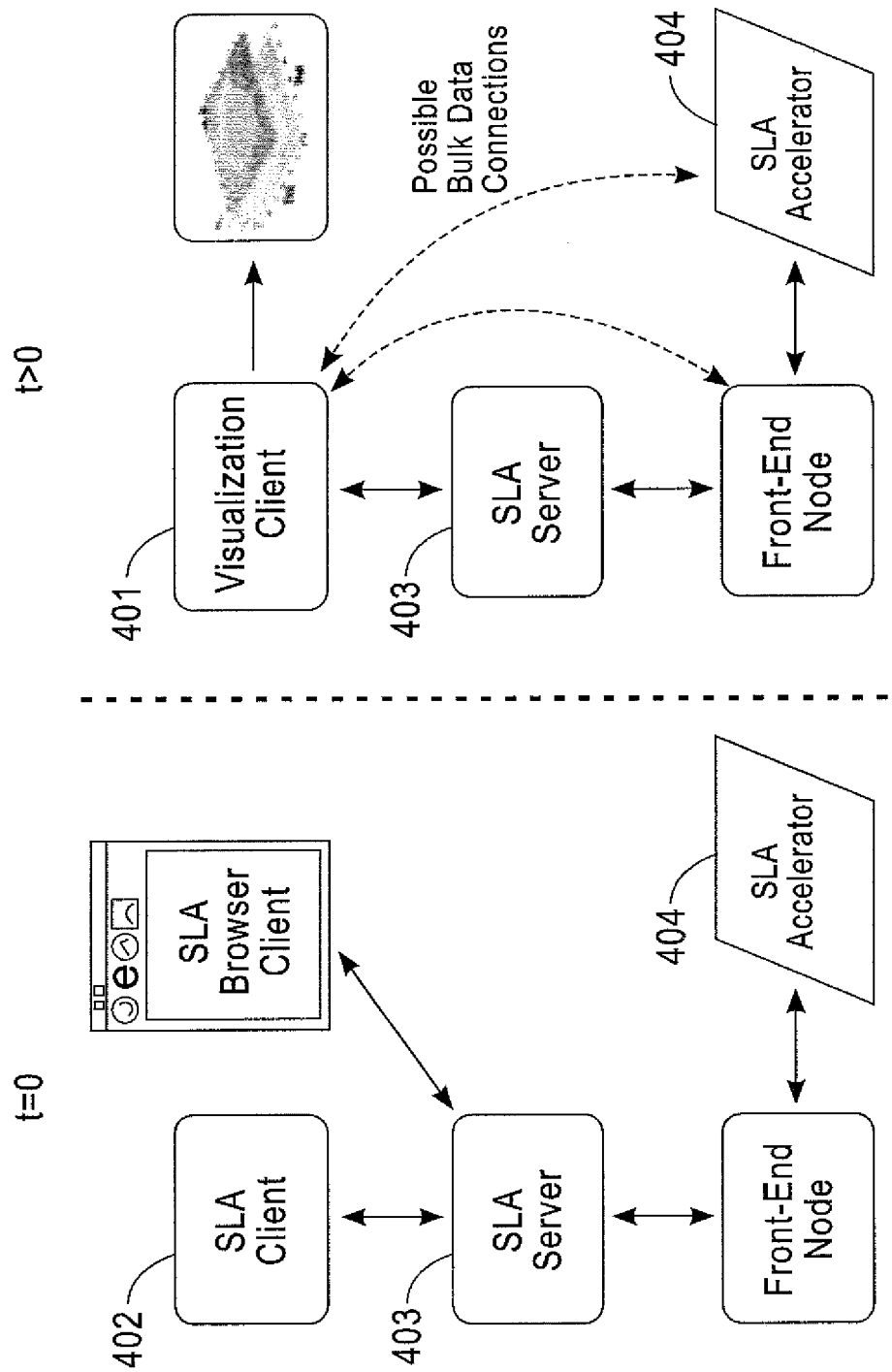
FIG. 4 illustrates a case of a changing clients over time according to an embodiment of the present disclosure.

The system level accelerator server allows multiple clients to connect simultaneously. Each connected client may communicate with a different accelerator, for example, an entirely different physical machine or an additional accelerator program running on the same physical machine (107). The system level accelerator server allows clients to disconnect from long-running computations and reconnect later to check progress. Referring to FIG. 4, the reconnecting client 401 need not be the same as the client 402 that initiated the long-running computation. That is, in FIG. 4, a system level accelerator client 402 connected to the system level accelerator server 403 at time t=0 and a later time t>0 a visualization client 401 connected to the system level accelerator server 403.

In FIG. 4, at time t=0 a computation is started on an accelerator 404 by a browser-based system level accelerator client or a special-purpose system level accelerator client. Later, at time t>0, a different system level accelerator client connects to the same computation on the same accelerator 404, using a visualization system for viewing the results of the computation. These results may be intermediate results. A computation may be initiated by a special-purpose system level accelerator client, which disconnects after initiating the computation. The same computation may be monitored periodically by a browser-based client and output results to a visualization client. Credentials (e.g., system level accelerator session name and password, for example) may be used for authorization multiple clients to access and modify the computation.

Figure 5:
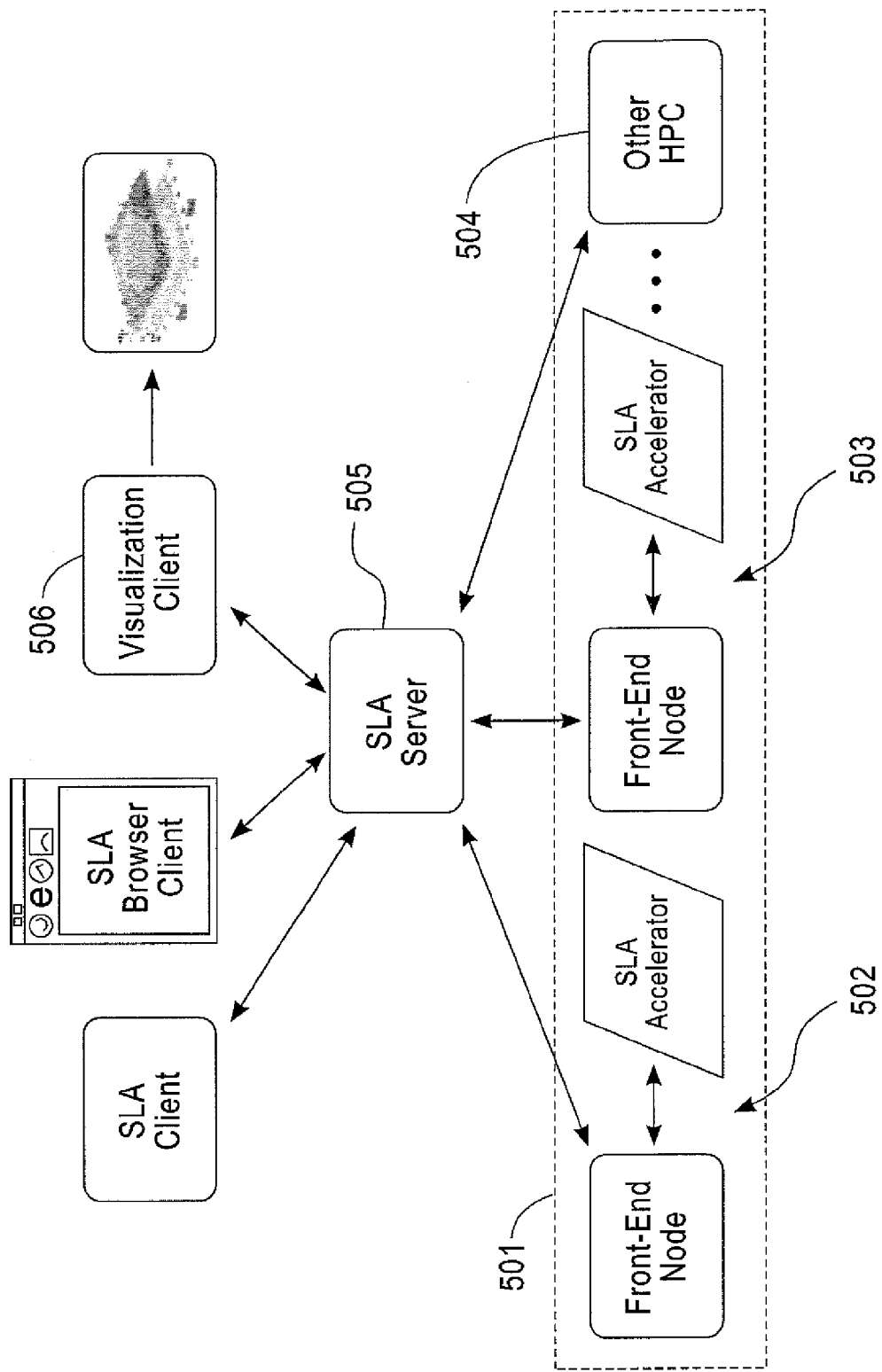
FIG. 5 is a diagram of a an accelerator in communication with a server having clients according to an embodiment of the present disclosure.

As shown in FIG. 5, acceleration may span a suite of machines. With the system level accelerator server acting as a single interface of the system level accelerator system, an accelerator appears to its clients as a single program running on an accelerator machine. The accelerator may be multiple programs, running in sequence or simultaneously on an accelerator machine or on multiple accelerator machines.

In FIG. 5, a single accelerator machine 501 includes multiple accelerators 502-504. Scripting languages may be used to orchestrate and coordinate the accelerators 502-504 of the accelerator machine 501. A system level accelerator server 505 may be aware of the state of a computation, what programs are executing to make the computation, and where those programs are executing. Clients, e.g., visualization client 506, need not know the state of the accelerator machine 501. The clients' contact with the system level accelerator system may be limited to the system level accelerator server 505, which resides at a known address.

Figure 6:
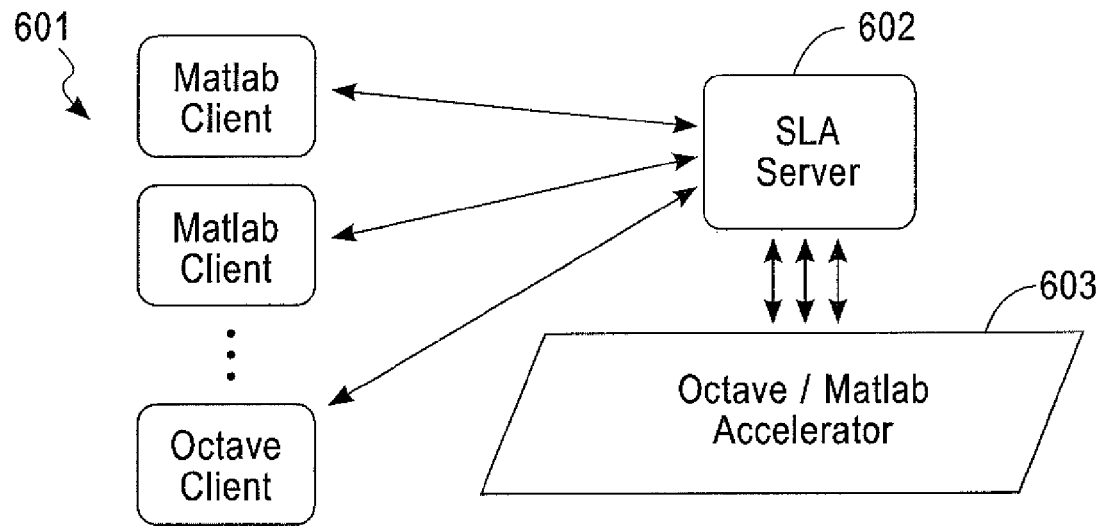
FIG. 6 is a diagram of a server and accelerator package according to an embodiment of the present disclosure.

Referring to FIG. 6, system level accelerator clients 601 may run as an application on a client device. The system level accelerator clients 601 may use a web browser interface to the system level accelerator server 602 without change. The system level accelerator clients 601 may also act as special-purpose clients, for example, using socket communications, XML generation, and parsing to communicate with the system level accelerator server 602.

Some of these system level accelerator clients 601, e.g., smart phones, offer different methods for interacting with an accelerator 603. For example, a camera component of a smart phone may be used to photograph a scene or a person's face for submission to a parallel image-recognition application via the system level accelerator server 602. Inclinometers, accelerometers, compass, GPS, audio, and other functions of the client device may enable different system level accelerator client interfaces to accelerators. For example, a pseudo-random number generator may be re-seeded by shaking a client device. In another example, voice commands may be translated by the client device or system level accelerator server and communicated to an accelerator.

According to an embodiment of the present disclosure, a system level accelerator server and accelerator may be packaged as an appliance. The appliance, referred to as a system level acceleration appliance, is a computer system designed and marketed to do a particular job.

For example, BLUE GENE systems are shipped with a general-purpose computer that acts as the machine's front-end node. The front-end node is a means by which users can submit jobs to the BLUE GENE. For the system level acceleration appliance, the front-end node and the system level acceleration server may be merged. The merger may be accomplished by running the system level acceleration server on the front-end node, or by replacing the front-end node with another computer that runs the system level accelerator server and front-end code for operating the BLUE GENE.

As an appliance, the general-purpose nature of the front-end node may not be exposed. For example, the only interface to the accelerator machine may be via the system level accelerator server. The system level accelerator server can still handle multiple clients, but in this configuration it is likely that the clients would all be of the same or similar type.

A system level accelerator appliance may be used in, for example, MATLAB and/or Octave accelerators, as is shown in FIG. 6, digital media processing, computer graphics rendering, image analysis, audio stream analysis, life sciences (e.g., bioinformatics), microscope imaging, array sequencers analysis, biomedical engineering, prototyping stents for manufacturing, developing heart implant devices, etc.

In medicine, a system level accelerator appliance may be a parallel medical analysis application on the accelerator machine, for example, processing PET/CT scans, with the medical professional's interface being via a WiFi-connected tablet computer such as an iPad.

The system level accelerator appliance may be implemented as hardware. To construct a system level accelerator appliance, the accelerator machine itself and its service node may be unchanged. The front-end node can be replaced by a computer on which to run the system level accelerator software and portions of the front-end node software. The system level accelerator appliance may have a network interface to the accelerator machine Ethernet and a network interface to the outside world (clients).

Figure 7:
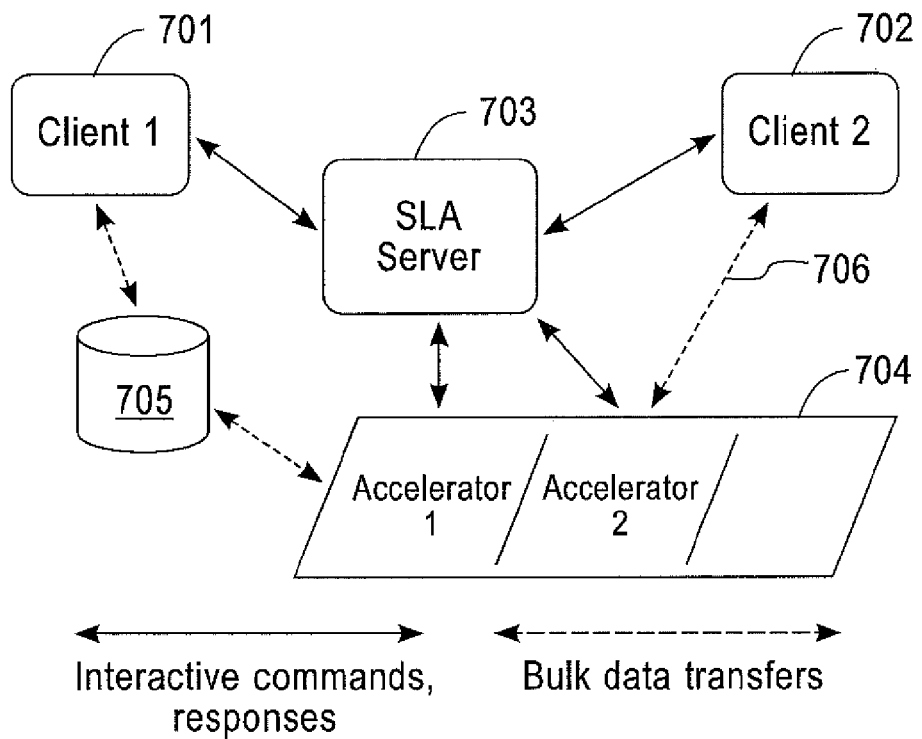
FIG. 7 illustrates communication between a client, server, and accelerator according to an embodiment of the present disclosure.

Referring to FIG. 7, for bulk data transfer, communication between clients 701-702 and the system level accelerator server 703 and between accelerators 704 and the system level accelerator server 703 involve exchanging XML records, which are text based. This is appropriate for sending commands and simple responses wherein the amount of data transferred is limited, for example, a few thousand bytes. Sending numeric values in XML typically involves converting the values from the binary form used for computation into printable form as a string of characters. For sending the contents of arrays containing millions of elements, though, text-based communication may be inefficient. One solution is for the client and accelerator to communicate directly with one another when transferring bulk data, bypassing the system level accelerator server. In FIG. 7 the solid arrows indicate the transfer of XML (text) records, while the dashed arrows indicate the transfer of bulk binary data.

The bypass may be achieved by use of a shared file system 705. Files can be written by one party and read by the other. Large bandwidth can be achieved, at the cost of some response time for writing and then reading such a file.

Alternatively, the bypass may be achieved by direct network connection 706 via sockets. Because of the way that most accelerator machine installations are designed, such client-to-accelerator machine connections may involve relaying the data via the accelerator machine's front-end node, because the accelerator machine itself is not generally connected to a network that's visible to the outside world. Still, bulk data transferred in this way avoids conversion of the binary values into character strings for XML transmission, and back to binary again once received.

In either case, the system level accelerator server is aware of and coordinates the communication between the client and server, but the system level accelerator server does not handle any of the data.

Figure 8A:
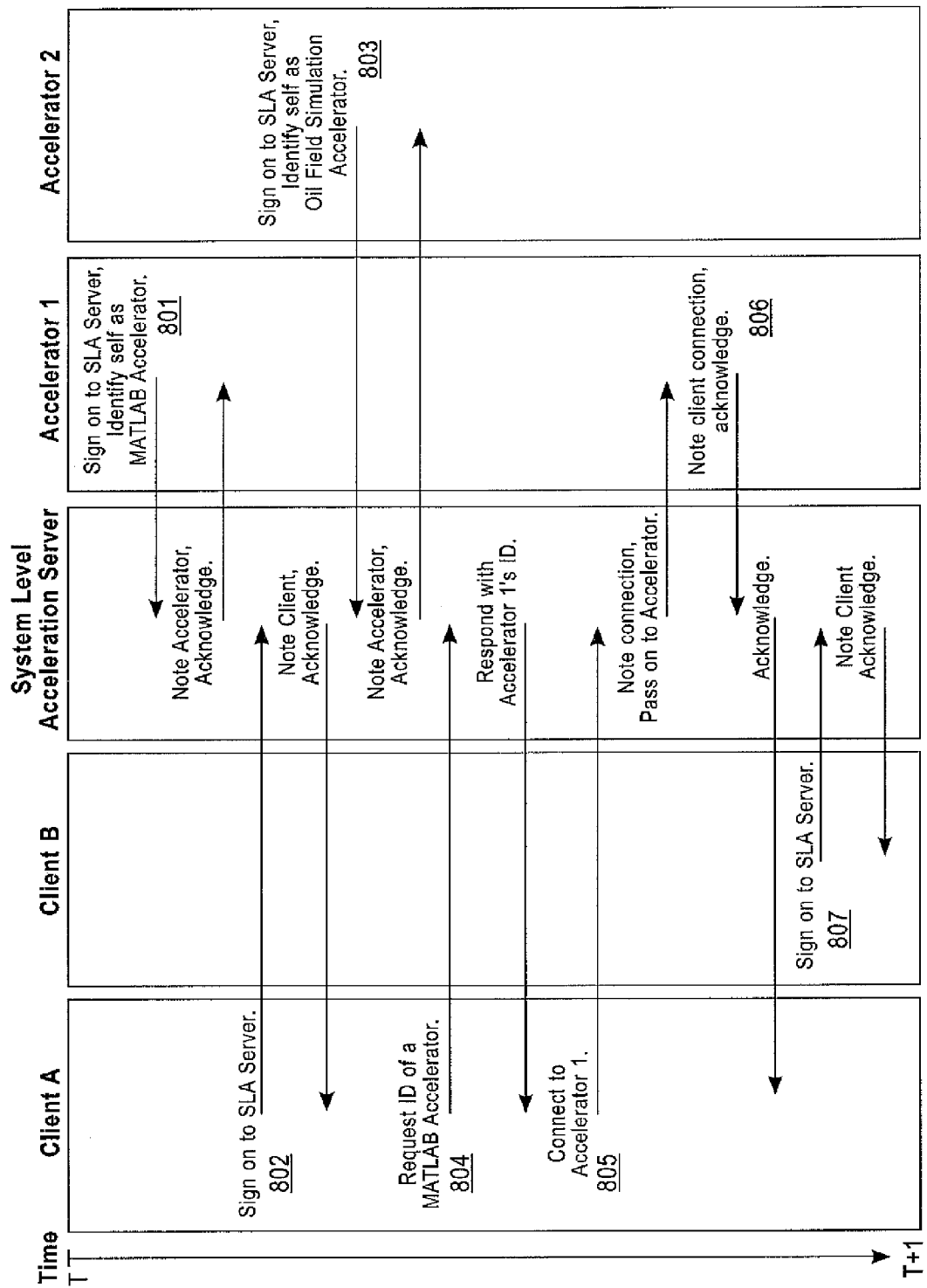
FIGS. 8A-C illustrate an exemplary method performed by a system level acceleration server, according to an embodiment of the present disclosure.
Figure 8B:
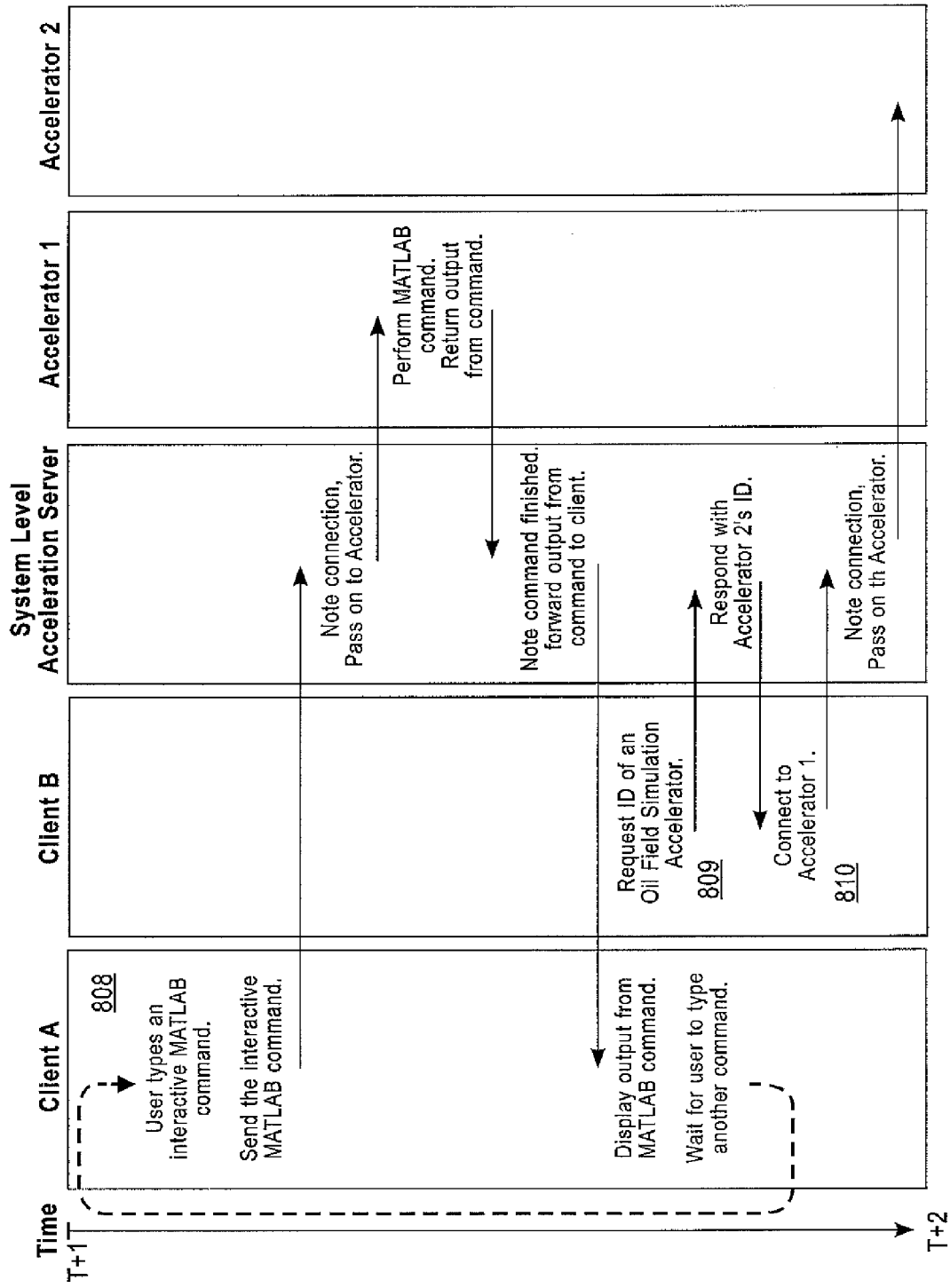
Figure 8C:
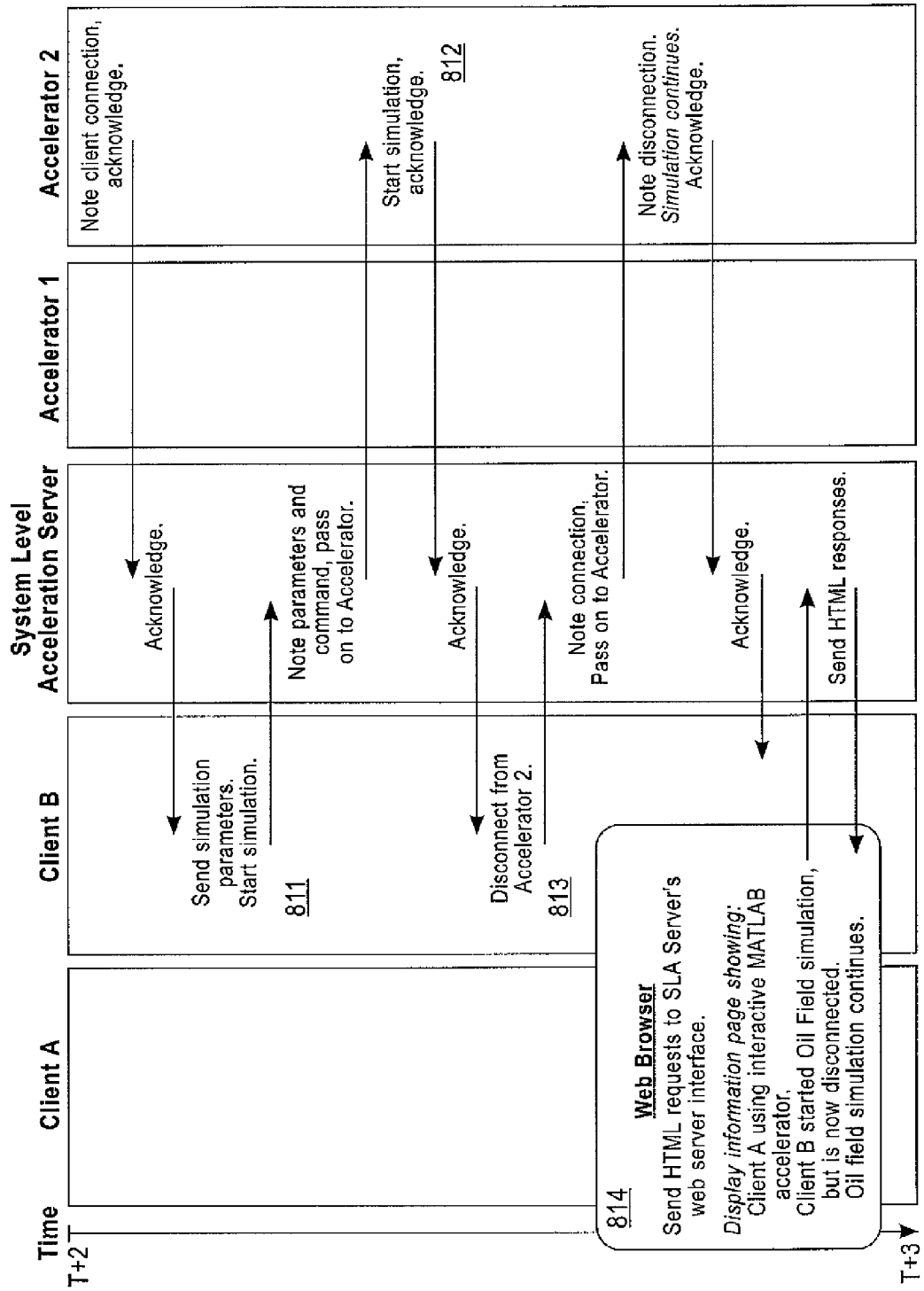

Referring now to an exemplary method of a system level acceleration, an oil field simulation may be executed using a system level acceleration server. As shown in FIG. 8A, a MATLAB accelerator connects to the system level acceleration server (801), client A connects to the system level acceleration server (802), and an oil field simulation accelerator connects to the system level acceleration server (803), the system level acceleration server now knows about two accelerators and one client. At block 804, client A asks the system level acceleration server to find a resource for it, such as an accelerator for interactive MATLAB commands. The system level acceleration server may respond with the MATLAB accelerator identification, which Client A will use to connect to the MATLAB accelerator (805). Client A connects to the MATLAB accelerator via the system level acceleration server (806). At block 807, the MATLAB accelerator is now prepared to accept MATLAB commands from Client A, and a Client B connects to the system level acceleration server (807). The system level acceleration server now knows about two accelerators and two clients. As shown in FIG. 8B, at block 808, Client A now starts "loop" sending MATLAB command via the system level acceleration server and displaying the results from the MATLAB accelerator. The system level acceleration server sees all the commands and responses, passing commands from client to accelerator and responses from accelerator to client. To the client, it is as if the MATLAB commands were being processed locally. This loop can continue indefinitely. At block 809, Client B, which connected to the system level acceleration server at block 807, asks the system level acceleration server to find a resource for it: an accelerator for the oil field simulation. The system level acceleration server responds with Accelerator 2's ID. At block 810, Client B connects to the oil field simulation accelerator, as Client A connected to the MATLAB accelerator. The system level acceleration server now knows that each of its two clients is connected to one of its two accelerators. Referring to FIG. 8C, at block 811, Client B sends a set of parameters that will control the oil field simulation, and sends the command that will start the simulation. At block 812, the oil field simulation accelerator begins the simulation. Client B disconnects from the oil field simulation accelerator, leaving the simulation running at block 813. The system level acceleration server now knows that Client A is engaged in an interactive command/response loop with the MATLAB accelerator and that Client B has disconnected, but the Client B it started is still running. Client B may reconnect at a later time. At block 814, a web browser is shown connected to the system level acceleration server's web server interface. The connection may have been made at any time during this scenario. At this point, the browser can request a status page from the system level acceleration server. The page will show that there are two clients, two accelerators, that Client A is using the MATLAB accelerator, that Client B has disconnected, and that Client B's simulation continues on the oil field simulation accelerator.

It should be noted that the system level acceleration server responds to requests for resources (e.g., a client asks for an accelerator) by considering all the accelerators that it knows about. Only two accelerators are described in the example of FIGS. 8A-C, one each of two different types, making the decision of which accelerator to use obvious. However, the system level acceleration server can handle many accelerators at once, including several of the same type. The system level acceleration server can make sophisticated decisions about which accelerator to match with each client's request based on for example, accelerator type, how busy the accelerator currently is, whether the accelerator has direct access to file systems needed for the client's computations, etc.

Furthermore, while the exemplary method of FIGS. 8A-C is shown occurring over time (T), the activities of the clients need have no particular order with respect to each other. In the example, Client A began before Client B, but this is not required.

Because the system level acceleration server sees all the command and response traffic between clients and accelerators, it may keep a detailed account of for example, operations, computations, etc., performed by accelerators. The system level acceleration server can display this knowledge via status pages available through its web server interface. Such status displays can be tailored to the needs of the customer (e.g., the owner of the network of clients and accelerators). Browser-based detailed status reports are probably new.

The system level acceleration server can be controlled through its web server interface. For example, if an accelerator has gone down and is not going to be coming back up, the SLA Server can be told via a web browser to remove the accelerator from its roster of available accelerators.

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the case of a remote computer scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 9:
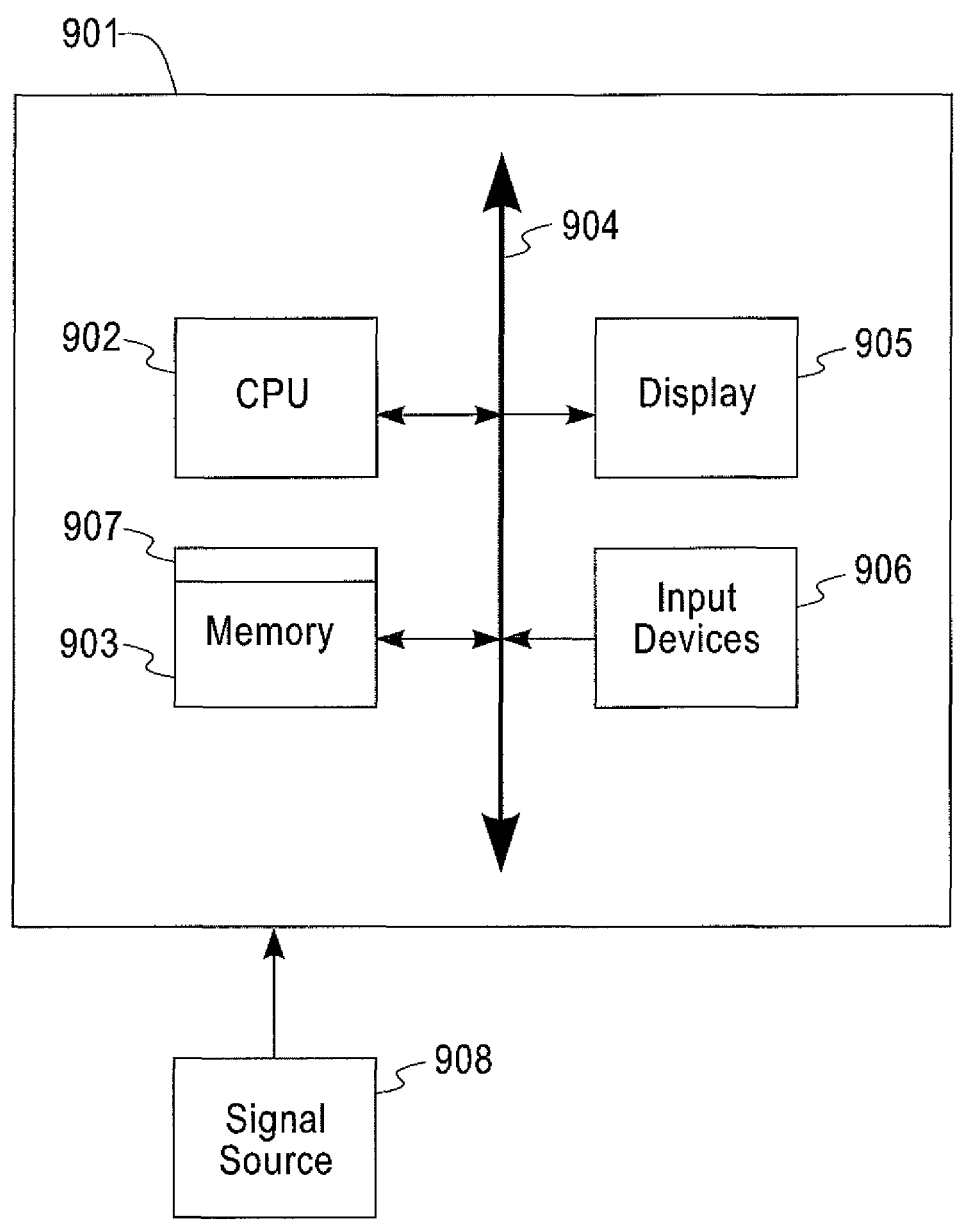
FIG. 9 is a diagram of a computer system for implementing an accelerator according to an embodiment of the present disclosure.

For example, FIG. 9 is a block diagram depicting an exemplary computer system for an accelerator machine. The computer system 901 may include a processor 902, memory 903 coupled to the processor (e.g., via a bus 904 or alternative connection means), as well as input/output (I/O) circuitry 905-906 operative to interface with the processor 902. The processor 902 may be configured to perform one or more methodologies described in the present disclosure, illustrative embodiments of which are shown in the above figures and described herein. Embodiments of the present disclosure can be implemented as a routine 907 that is stored in memory 903 and executed by the processor 902 to process the signal from the signal source 908. As such, the computer system 901 is a general-purpose computer system that becomes a specific purpose computer system when executing the routine 907 of the present disclosure.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A method for executing a computer application, comprising:
    running a computer application from a client machine, the computer application including one or more parallel computations that are too large to be computed by the client machine;
    sending the one or more parallel computations to a system level acceleration server;
    assigning, at the system level acceleration server, each of the one or more parallel computations to one of a plurality of accelerators;
    computing each of the one or more parallel computations in its assigned accelerator;
    returning computation results from the plurality of accelerators back to the system level acceleration server; and
    passing each of the computation results from the system level acceleration server back to the computer application running on the client machine,
    wherein commands and simple responses are sent between the plurality of accelerators and the computer application running on the client machine via the system level acceleration server, while bulk data is transferred directly between the plurality of accelerators and the computer application running on the client machine, bypassing the system level acceleration server by using a file system that is shared between the plurality of accelerators and the computer application running on the client machine.

2. The method of claim 1, wherein the system level acceleration server assigns parallel computations to the plurality of accelerators from multiple client machines simultaneously.

3. The method of claim 1, wherein the system level acceleration server assigned each of the one or more parallel computations to one of a plurality of accelerators according to the computational needs of the parallel computations and the capabilities and availability of the accelerators.

4. The method of claim 1, wherein the plurality of accelerators includes distinct accelerators with varying capabilities.

5. The method of claim 4, wherein the plurality of accelerators includes at least one accelerator for computing MATLAB commands.

6. The method of claim 4, wherein the plurality of accelerators includes at least one accelerator for computing Octave commands.

7. The method of claim 4, wherein the plurality of accelerators includes at least one accelerator for computing simulations.

8. The method of claim 4, wherein the plurality of accelerators includes at least one accelerator for processing medical images.

9. A computer program product for executing a computer application, the computer program product comprising a non-transitory computer readable storage medium having computer readable program code embodied therewith, the computer readable program code comprising:
   computer readable program code configured to run a computer application from a client machine, the computer application including one or more parallel computations that are too large to be computed by the client machine;
   computer readable program code configured to send the one or more parallel computations to a system level acceleration server;
   computer readable program code configured to assign, at the system level acceleration server, each of the one or more parallel computations to one of a plurality of accelerators;
   computer readable program code configured to compute each of the one or more parallel computations in its assigned accelerator;
   computer readable program code configured to compute return computation results from the plurality of accelerators back to the system level acceleration server; and
   computer readable program code configured to pass each of the computation results from the system level acceleration server back to the computer application running on the client machine,
   wherein commands and simple responses are sent between the plurality of accelerators and the client machine via the system level acceleration server, while bulk data is transferred directly between the plurality of accelerators and the client machine, bypassing the system level acceleration server by using a file system that is shared between the plurality of accelerators and the client machine.

10. The computer program product of claim 9, wherein the system level acceleration server assigns parallel computations to the plurality of accelerators from multiple client machines simultaneously.

11. The computer program product of claim 9, wherein the system level acceleration server assigned each of the one or more parallel computations to one of a plurality of accelerators according to the computational needs of the parallel computations and the capabilities and availability of the accelerators.

12. The computer program product of claim 9, wherein the plurality of accelerators includes distinct accelerators with varying capabilities.

13. The computer program product of claim 12, wherein the plurality of accelerators includes at least one accelerator for computing MATLAB commands.

14. The computer program product of claim 12, wherein the plurality of accelerators includes at least one accelerator for computing Octave commands.

15. The computer program product of claim 12, wherein the plurality of accelerators includes at least one accelerator for computing simulations.

16. The computer program product of claim 12, wherein the plurality of accelerators includes at least one accelerator for processing medical images.

* * * * *